(12) United States Patent
Rogers et al.

(10) Patent No.: US 9,935,494 B2
(45) Date of Patent: Apr. 3, 2018

(54) ELEVATOR POWER SUPPLY FOR INVERTER CONTROLLER

(75) Inventors: Kyle W. Rogers, Stamford, CT (US); Daryl J. Marvin, Farmington, CT (US); Craig Drew Bogli, Avon, CT (US); Leslie C. Watterson, Unionville, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 575 days.

(21) Appl. No.: 14/401,319

(22) PCT Filed: May 15, 2012

(86) PCT No.: PCT/US2012/037868
§ 371 (c)(1),
(2), (4) Date: Nov. 14, 2014

(87) PCT Pub. No.: WO2013/172818
PCT Pub. Date: Nov. 21, 2013

(65) Prior Publication Data
US 2015/0136531 A1    May 21, 2015

(51) Int. Cl.
*B66B 1/06* (2006.01)
*H02J 9/06* (2006.01)
(Continued)

(52) U.S. Cl.
CPC .................. *H02J 9/06* (2013.01); *B66B 1/30* (2013.01); *B66B 5/00* (2013.01); *B66B 5/027* (2013.01); *H02J 9/062* (2013.01)

(58) Field of Classification Search
CPC .... H02J 9/06; H02J 9/062; B66B 1/30; B66B 5/00; B66B 5/027
(Continued)

(56) References Cited

U.S. PATENT DOCUMENTS 3,902,573 A * 9/1975 Grove ..................... B66B 5/027
                                                      187/290
4,484,664 A * 11/1984 Nomura .................. H02J 9/066
                                                      187/290
(Continued)

FOREIGN PATENT DOCUMENTS

CN          1696036 A     11/2005
JP       2002154756 A      5/2002
(Continued)

OTHER PUBLICATIONS

European Search report for application 12877003.9, dated Jan. 22, 2016, 9 pages.
(Continued)

*Primary Examiner* — Anthony Salata
(74) *Attorney, Agent, or Firm* — Cantor Colburn LLP

(57) ABSTRACT

A power architecture includes a panel receiving power from a power grid through a breaker, a power supply coupled to the breaker to receive power from the grid, a battery coupled to the power supply through a switch, an elevator motor controller coupled to the power supply, the power supply providing power from at least one of the grid and the battery to the controller, and a charger coupled to the breaker and the battery and configured to receive power from the power grid and provide power to the battery to charge the battery.

7 Claims, 3 Drawing Sheets

(51) Int. Cl.
*B66B 1/30* (2006.01)
*B66B 5/02* (2006.01)
*B66B 5/00* (2006.01)

(58) Field of Classification Search
USPC ....... 187/247, 289, 290, 293, 296, 297, 391, 187/393; 307/64, 66, 68; 318/376, 318/799–815; 320/128, 130, 131, 132, 320/133, 135
See application file for complete search history.

(56) References Cited

U.S. PATENT DOCUMENTS

| | | | | |
|---|---|---|---|---|
| 4,506,766 A | * | 3/1985 | Watanabe | B66B 5/027 187/290 |
| 4,516,665 A | * | 5/1985 | Watanabe | B66B 5/02 187/296 |
| 5,058,710 A | | 10/1991 | Iwasa | |
| 5,285,029 A | * | 2/1994 | Araki | B66B 5/027 187/290 |
| 5,864,474 A | | 1/1999 | Jang | |
| 5,896,948 A | * | 4/1999 | Suur-Askola | B66B 1/30 187/290 |
| 6,315,081 B1 | * | 11/2001 | Yeo | B66B 5/02 187/290 |
| 6,415,892 B2 | * | 7/2002 | Araki | B66B 1/302 187/290 |
| 6,431,324 B2 | * | 8/2002 | Tajima | B66B 1/30 187/290 |
| 6,439,348 B2 | * | 8/2002 | Tajima | B66B 1/30 187/290 |
| 6,522,099 B2 | * | 2/2003 | Tominaga | B66B 1/30 187/290 |
| 7,114,594 B2 | * | 10/2006 | Rossignol | B66B 11/002 187/276 |
| 7,246,686 B2 | * | 7/2007 | Smith | B66B 1/308 187/290 |
| 8,146,714 B2 | * | 4/2012 | Blasko | B66B 1/30 187/290 |
| 8,172,042 B2 | * | 5/2012 | Wesson | B66B 1/302 187/290 |
| 9,118,270 B2 | * | 8/2015 | Niwa | H02P 3/12 |
| 9,296,589 B2 | * | 3/2016 | Marvin | B66B 1/302 |
| 9,481,549 B2 | * | 11/2016 | Ishiguro | B66B 1/302 |
| 2001/0017239 A1 | | 8/2001 | Tajima et al. | |
| 2015/0203328 A1 | * | 7/2015 | Horbrugger | B66B 1/302 187/290 |

FOREIGN PATENT DOCUMENTS

| | | |
|---|---|---|
| JP | 2002154759 A | 5/2002 |
| JP | 2007331851 A | 12/2007 |
| WO | 2011015895 A1 | 2/2011 |

OTHER PUBLICATIONS

International Search Report for application PCT/US2012/037868, dated Jan. 31, 2013, 5 pages.
Written Opinion for applicaiton PCT/US2012/037868, dated Jan. 31, 2013, 5 pages.
Second Chinese Office Action for application CN 201280073175.4, dated Feb. 15, 2017, 14pgs.

\* cited by examiner

ELEVATOR POWER SUPPLY FOR INVERTER CONTROLLER

BACKGROUND

Batteries are becoming increasingly prevalent in systems, such as elevator systems. One reason a battery may be implemented in an elevator system is to provide backup power for rescue functions in the event of a power loss in the system.

Batteries used in elevator applications may provide direct current (DC) voltages. Many elevator controllers, however, are designed to receive alternating current (AC) voltages. In order to interface a DC battery to an AC controller, a DC-to-AC (DC/AC) converter may be used. Alternatively, the controller may be reconfigured or replaced so as to run off of the DC battery at all times. Running on the batteries at all times may be problematic, because it may require a second energy conversion to power the controller, and it creates a single point of failure at the battery, thereby reducing reliability.

BRIEF SUMMARY

An embodiment of the disclosure is directed to a power architecture for an elevator system, the power architecture comprising: a panel receiving power from a power grid through a breaker, a power supply coupled to the breaker to receive power from the grid, a battery coupled to the power supply through a switch, an elevator motor controller coupled to the power supply, the power supply providing power from at least one of the grid and the battery to the controller, and a charger coupled to the breaker and the battery and configured to receive power from the power grid and provide power to the battery to charge the battery.

An embodiment of the disclosure is directed to an apparatus comprising: an elevator motor controller configured to be powered by a grid when power provided by the grid is available, a battery coupled to the grid and configured to be charged by power received from the grid when the power from the grid is available and to supply power to the controller when the power from the grid is unavailable, a switch configured to selectively isolate power stored in the battery from the controller based on a position of the switch that is selected from a breaker included in a panel of a doorframe, and the switch opens when the breaker opens and the switch closes when the power provided by the grid is unavailable.

An embodiment of the disclosure is directed to a method comprising: charging a battery from power supplied by a source, powering an elevator motor controller from the source when power from the source is available, sensing at least one parameter associated with the source, and switching the power to the controller from the source to power provided by the battery when the sensed at least one parameter exceeds a threshold.

Additional embodiments are described below.

BRIEF DESCRIPTION OF THE DRAWINGS

The present disclosure is illustrated by way of example and not limited in the accompanying figures in which like reference numerals indicate similar elements.

DETAILED DESCRIPTION

Figure 1A:
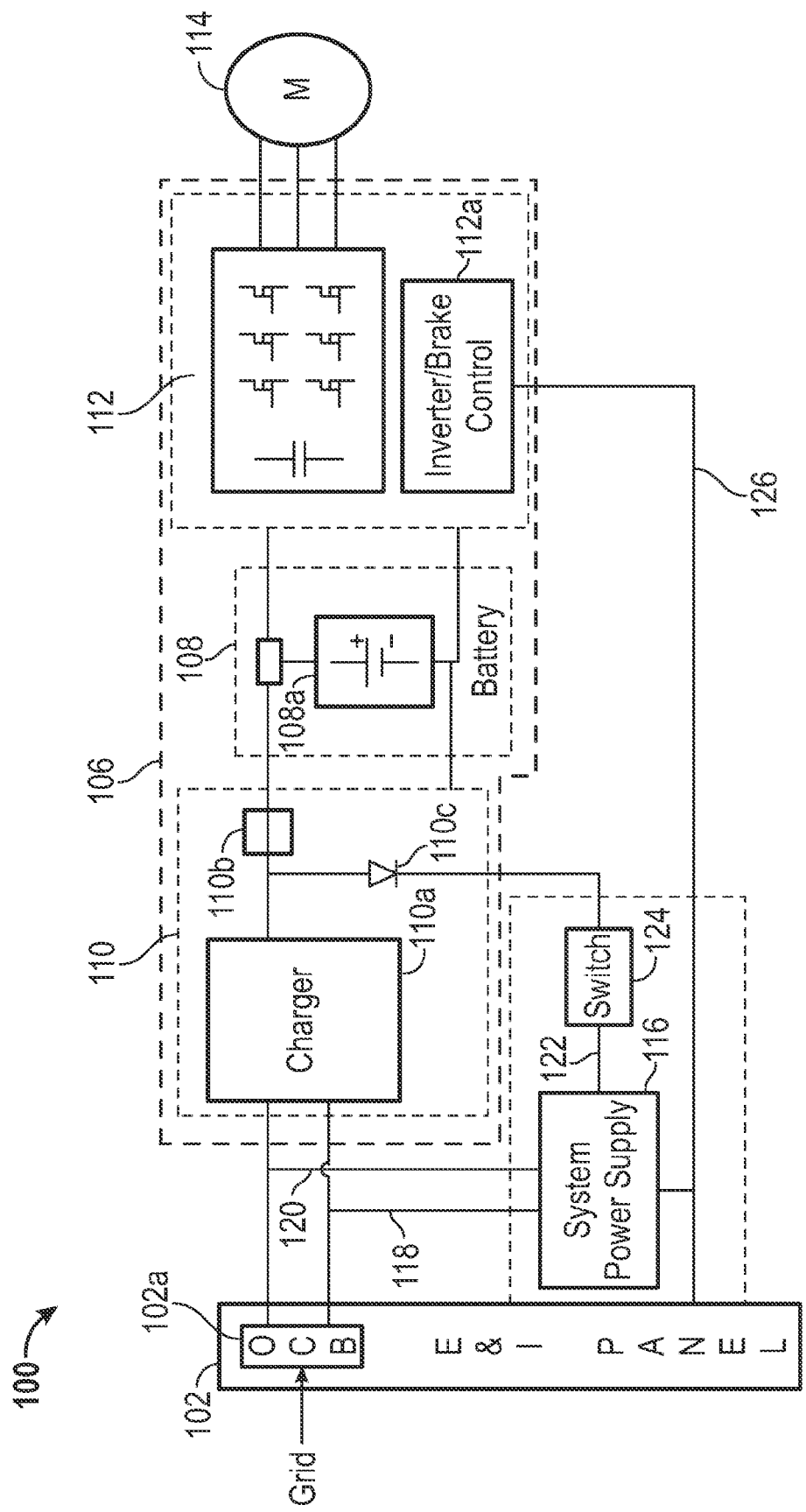
FIG. 1A illustrates an exemplary power supply architecture in an exemplary embodiment.

Exemplary embodiments of apparatuses, systems and methods are described for safely and effectively distributing power. In some embodiments, power to, e.g., an elevator may be provided from one or more sources. The one or more sources may include a grid and a battery. Embodiments may be used to selectively connect or disconnect power to an elevator. A select coupling of power may help to ensure safety of personnel when, e.g., servicing, maintaining, or repairing the elevator.

In some embodiments, efficient and cost effective solutions may be provided for interfacing a controller to a battery. In some embodiments, the controller might not be entirely reliant on the battery and might not need a DC/AC converter to be powered from the battery. In some embodiments, reliability may be improved or enhanced by avoiding a single point failure at the battery.

It is noted that various connections are set forth between elements in the following description and in the drawings (the contents of which are included in this disclosure by way of reference). It is noted that these connections in general and, unless specified otherwise, may be direct or indirect and that this specification is not intended to be limiting in this respect. In this respect, a coupling between entities may refer to either a direct or an indirect connection.

FIG. 1A illustrates an architecture 100 in an exemplary embodiment. The architecture 100 may be included as a part of an elevator or elevator system. The architecture 100 may comprise a power supply architecture and may be configured to selectively power an elevator or components thereof.

The architecture 100 may include a panel 102. The panel 102 may be located in a doorframe at an elevator landing and may be used to obtain access to elevator system components. For example, personnel (e.g., service, repair, or maintenance personnel, rescue personnel, fire personnel, police, etc.) may obtain access to components or functionality of the elevator via the panel 102. The panel 102 may include, or be associated with, an emergency and inspection (E&I) panel. For example, the panel 102 may be used by personnel to respond to emergencies or to perform an inspection. The inspection may include maintenance, repair, (component) installation, or (component) removal activities.

The panel 102 may include a breaker 102a. The breaker 102a may be, or include, an over current breaker (OCB). The breaker 102a may be configured to limit over-currents or spikes in an electrical portion of the elevator system.

The panel 102 may receive power from a grid as shown in FIG. 1A. The grid power may serve as the primary source of input power to the architecture 100 or to an elevator. The architecture 100 may be powered from the grid unless the grid fails or ceases to provide or source power. If and when the grid fails to provide or source power, the architecture 100 may utilize a secondary source of power, such as a battery, as described below.

The panel 102 (e.g., the breaker 102a) may be used to selectively provide power to the elevator. For example, power may be supplied to a drive 106 of the elevator during normal use, but power may be cutoff to the drive in order to immobilize the elevator in emergency or rescue situations. The breaker 102a may be used to isolate the grid power from the rest of the architecture 100. For example, the breaker 102a may include an isolation mechanism, such as a switch (not shown in FIG. 1A), to isolate the grid input power from the rest of the architecture 100.

The drive 106 may include, or be composed of, one or more stages. A first stage 108, a second stage 110, and a third stage 112 are shown in FIG. 1A.

The first stage 108 may provide for a secondary power source, such as a battery 108a. The battery 108a may be manufactured in accordance with any technology known to one skilled in the art. For example, the battery 108a may incorporate lithium ion technology. The battery 108a may be used as a source of power in the event that the grid input power is unavailable.

The second stage 110 may include a charger 110a. The charger 110a may be used to charge the battery 108a. For example, during normal operation (e.g., when grid input power is available), the charger 110a may provide a voltage, such as 48 VDC, to the battery 108a to charge the battery 108a. In some embodiments, the charger 110a may continuously charge or "top-off" the battery 108a, at least so long as grid input power is available. A device 110b may be included to potentially isolate the charger from one or more downstream components. For example, the device 110b may be, or include, a fuse. The fuse may be selectively opened to protect, e.g., the battery 108a in the event that a parameter (e.g., a current) sourced from the grid is excessively high (e.g., exceeds a rating of the fuse).

The third stage 112 may include an inverter, such as a three-phase inverter, configured to generate currents for a motor 114 of the elevator. The third stage 112 may also be configured to provide velocity control for the elevator.

The architecture 100 may include a power supply 116. While shown as a separate entity in FIG. 1A, in some embodiments the power supply 116 may be included or integrated in another component, such as the panel 102.

In some embodiments, the power supply 116 may be used to provide system or controller power. The power supply 116 may receive power from a plurality of sources. For example, the power supply 116 may receive input power from the grid, via the panel 102 (e.g., via the breaker 102a), over a line 118 and/or a line 120. The input power provided by the grid may be used by the power supply 116 as a primary source of power. The power supply 116 may receive input power from the battery 108a over a line 122, via the device 110b, a diode 110c, and a switch 124. The power supply 116 may utilize the power provided by the battery 108a as a secondary source of power in the event that the grid fails or ceases to provide power.

As shown in FIG. 1A, the anode of the diode 110c may be coupled to the battery 108a and the cathode of the diode 110c may be coupled to the power supply 116. The diode 110c may serve one or more purposes. For example, the diode 110c may help to ensure that when grid power is available that the power supply 116 does not charge the battery 108a. In other words, the diode 110c may help to ensure that the charging of the battery 108a occurs via the charger 110a. The diode 110c may help to ensure that when the grid power is available that power output from the charger 110a is directed to the battery 108a (so as to charge the battery 108a) as opposed to the power supply 116. The diode 110c may serve to isolate the battery 108a from the power supply 116 when the grid power is available, and otherwise provide power from the battery 108a to the power supply 116 when the grid power is unavailable (or is approximately less than the turn-on or forward voltage associated with the diode 110c).

The output of the power supply 116 may be provided to an inverter/brake control 112a via a line 126. As described above, the power supply 116 may receive input power from the grid or the battery 108a. Accordingly, the inverter/brake control 112a may be powered, in effect, from at least two sources via the line 126.

The switch 124 may be used to isolate the battery 108a from the power supply 116. For example, personnel may place the switch 124 in a state or position of "open" to isolate the battery 108a from the power supply 116. The switch 124 may be selectively opened (or closed) to isolate (or couple) the battery 108a and the power supply 116. In an embodiment, controller 112a is DC powered. System power supply 116 converts AC power from the grid to DC power for controller 112a. System power supply 116 also provides DC power from battery 108a to controller 112a, without any conditioning in exemplary embodiments.

In some embodiments the switch 124 may be located in, or controlled from, the panel 102. For example, the switch 124 may be integrated in the breaker 102a. Locating the switch in the panel 102 and/or the breaker 102a may provide convenience, as personnel may have an opportunity to isolate the battery 108a via the same interface that may be used to isolate the grid input power. In some embodiments, the switch 124 may be, or include, a relay and/or a contactor.

Switch 124 is configured to open when the breaker 102a is activated. In other words, if breaker 102a detects an overcurrent condition, then both breaker 102a and switch 124 are opened to remove power from the controller 112a to prevent the system from running. In the event of a grid failure where power is not being provided to panel 102 by the grid, switch 124 is closed to allow the controller 112a to be powered by battery 108a.

In some embodiments, the components of the architecture 100 may be arranged different from what is shown in FIG. 1A, or may perform a function different from that described above. For example, in an alternative embodiment, the first stage 110 (potentially in combination with other components or devices) may serve a function similar to the power supply 116, allowing the power supply 116 to be removed from the alternative embodiment. Also, in the alternative embodiment, one or both of the diode 110c and the switch 124 may be coupled with the charger 110a and the first stage 108.

Figure 1B:
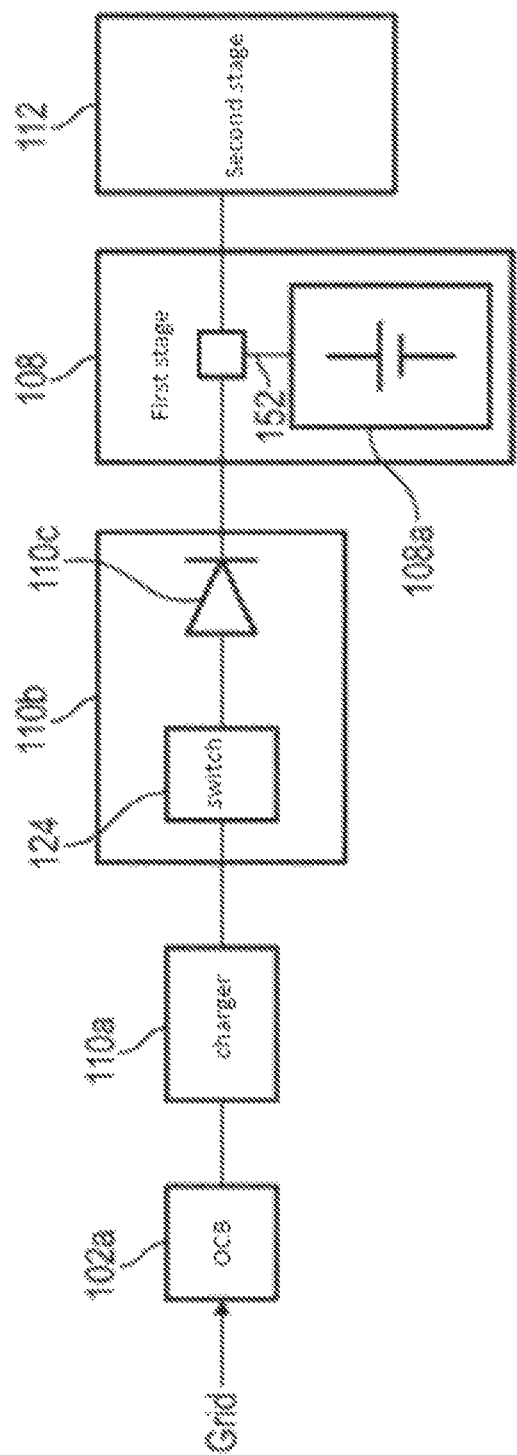
FIG. 1B illustrates a variation on the exemplary power supply architecture of FIG. 1A.

A block diagram reflecting a version of the alternative embodiment described above is shown in FIG. 1B. A number of details have been omitted from the diagram of FIG. 1B, relative to the diagram of FIG. 1A, for the sake of illustrative simplicity. As shown in FIG. 1B, the breaker 102a may be coupled to the charger 110a. The charger 110a may be coupled to the device 110b, which may include the switch 124 and/or the diode 110c. The device 110b may be coupled to the first stage 108. The first stage 108 may be coupled to the third stage 112. In some embodiments, a switch (not shown) may be installed in a line 152 coupling the battery 108a to the third stage 112. Such a switch in the line 152 may serve as a mechanism to selectively isolate the battery 108a from the third stage 112. In some embodiments, the switch in line 152 may be included in, or controlled from, the panel 102 and/or the breaker 102a.

In FIG. 1B, input power from the grid may flow in a left to right direction. For example, power from the grid may flow from the grid to the breaker 102a, from the breaker 102a to the charger 110a, from the charger 110a to the device 110b, from the device 110b to the second stage 108, and from the second stage 108 to the third stage 112. As before, in FIG. 1B, the battery 108a may be charged, in effect, by the grid when power is available from the grid. The diode 110c may isolate the grid from the battery 108a when power from the grid is unavailable (e.g., when the input from the grid is approximately less than the forward or turn-on voltage of the diode 110c plus any voltage drop sustained across the breaker 102a, the charger 110a, and the switch 124). In this manner, when power from the grid is unavailable, the third stage 112 may be powered from the battery 108a. In FIG. 1B, the switch 124 may be used to isolate the grid from, e.g., the first stage 108. For example, the switch 124 may be opened in FIG. 1B in connection with troubleshooting or test activities (e.g., to test that the battery 108a is functioning).

FIGS. 1A and 1B are illustrative. In some embodiments, one or more of the components of FIGS. 1A and 1B may be optional. In some embodiments, additional components not shown may be included.

In some embodiments, one or more components or devices may be used to share or distribute power. For example, the grid and the battery 108a may be used in conjunction with one another, such that both the grid and the battery 108a may provide power simultaneously. In some embodiments, the grid may supply an equal amount of power as the battery 108a supplies. In some embodiments, the grid may supply an amount of power that is different from an amount of power supplied by the battery 108a.

Figure 2:
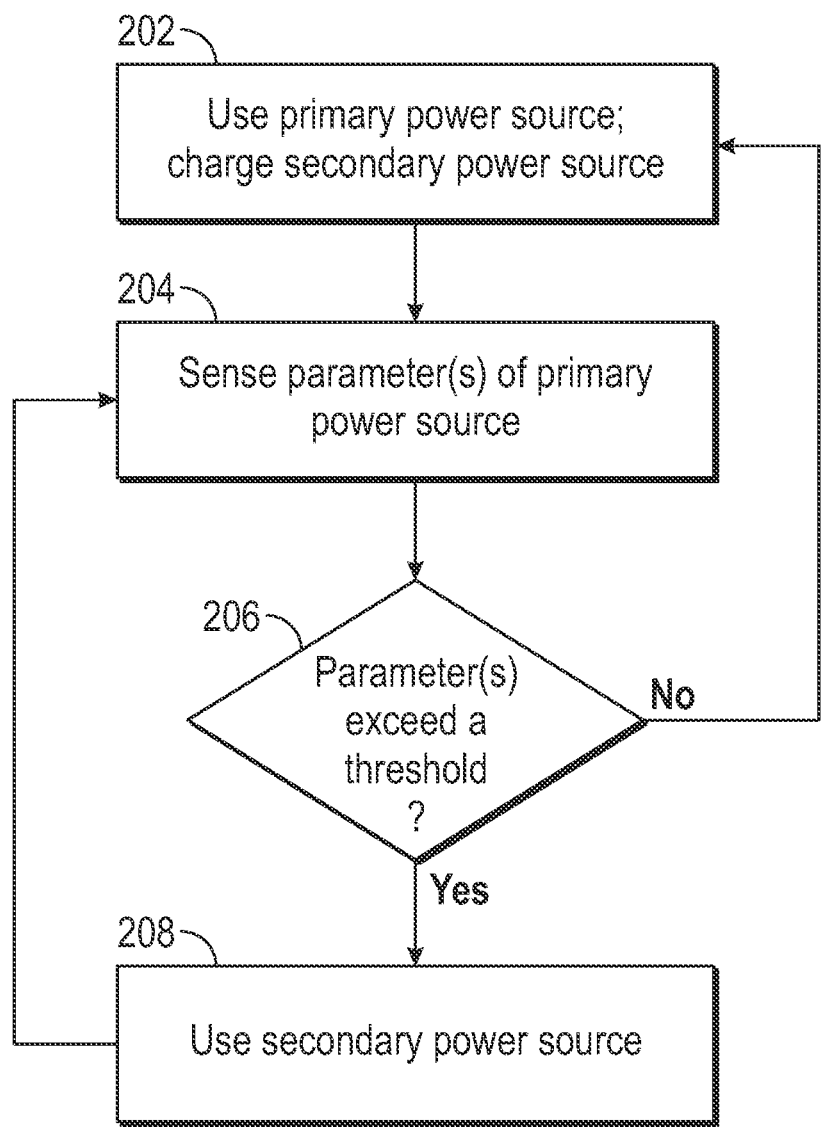
FIG. 2 illustrates an exemplary method of operating a power supply architecture in an exemplary embodiment.

FIG. 2 illustrates a method that may be used in connection with one or more platforms or architectures. For ease of illustration, the method of FIG. 2 is described below in connection with the architectures illustrated in FIGS. 1A and 1B. The method may be adapted to accommodate other architectures. The method of FIG. 2 may be used to regulate a flow of power within a system or architecture. In some embodiments, the method of FIG. 2 may be used to supply power to an entity, such as a controller, from one or more power sources.

In step 202, a primary power source may be selected to supply power. For example, grid power may be used as a primary power source. As part of step 202, a secondary power source may be charged. For example, the battery 108a may be charged from the grid power via the charger 110a. The charging of the battery 108a may occur at a particular frequency, periodically, or continuously. For example, the charging of the battery 108a may continue to occur so long as power is available from the grid.

In step 204, a status of a primary power source may be monitored. For example, referring to FIG. 1A, the power supply 116 may sense one or more parameters (e.g., power, energy, voltage, current) associated with the grid via one or both of the lines 118 and 120. Referring to FIG. 1B, the device 110b (e.g., diode 110c) may sense the one or more parameters associated with the grid based on a characteristic (e.g., the forward or turn-on voltage of the diode 110c) of the device 110b.

In step 206, the sensed parameter(s) of step 204 may be utilized to determine which power source selected from a plurality of power sources to use. Referring to FIG. 1A, if the power supply 116 determines that the sensed parameter(s) exceed or fall below a threshold, the flow may proceed from step 206 to step 208 along the "Yes" path out of step 206. Otherwise, if the power supply 116 determines that the sensed parameter(s) do not exceed or fall below the threshold, flow may proceed from step 206 back to step 202 along the "No" path to continue charging the secondary power source, and power may be supplied by the grid. Referring to FIG. 1B, if the grid power falls below the forward or turn-on voltage of the diode 110c (plus any drop sustained by the breaker 102a, the charger 110a, and the switch 124), diode 110c may, in effect, turn off which may result in a flow from step 206 to step 208 along the "Yes" path. Otherwise, if the grid power is above the threshold, flow may proceed from step 206 to step 202 along the "No" path to continue charging the secondary power source, and power may be supplied by the grid.

In step 208, a use (or switchover) to a secondary power source may occur. For example, use of the battery 108a may occur via a selection of the battery 108a by the power supply 116 (FIG. 1A) or as a result of the diode 110c turning off (FIG. 1B). Flow may proceed from step 208 to step 204 to sense one or more parameter(s) of the primary power source (e.g., to determine if the grid power is turned back, is restored, or is otherwise available again).

The method illustrated in connection with FIG. 2 is illustrative. In some embodiments, one or more of the steps (or portions thereof) may be optional. In some embodiments, additional steps not shown may be included. In some embodiments, the steps may execute in an order or sequence different from what is shown.

In some embodiments, hysteresis may be used to avoid excessive toggling between the primary and second power sources if the sensed parameter(s) of the primary power source are proximate to the threshold value(s) associated with step 206. The size or extent of the hysteresis window may be selected or adjusted based on the particular application or environment.

In some embodiments, one or more of the components, devices, or steps described herein may include, or be associated with, a controller, such as a low voltage architecture controller (LVA). The controller may be powered from a primary input source (e.g., a grid) during normal operation, and then be powered from a secondary power source (e.g., a battery) in the event of an unavailability (e.g., failure) of the primary input source.

In an elevator application, the controller may provide power to a brake and/or drive logic, such that if the controller is disconnected the brake might not lift and the drive might be unable to move the elevator, even though propulsion power may still exist in, e.g., a battery. This may allow personnel to obtain control of the elevator. Additionally, in the event that the (propulsion) battery fails, grid power may still be available, and the controller may remain powered, allowing rescue operations to be performed.

In some embodiments, an increased efficiency may be realized relative to conventional designs. For example, the controller may normally be powered from the primary power source in the most efficient manner. A transition from the primary power source to the secondary power source might only occur when the primary power source is unavailable. Furthermore, a transition from the secondary power source to the primary power source might occur as soon as the primary power source is available.

In some embodiments, safety or reliability may be enhanced relative to conventional designs. For example, embodiments may eliminate risk associated with a single point failure that could disable, e.g., an (entire) elevator because the risk of both the primary and second power sources failing may be considered negligible.

In some embodiments, the use of the controller, or an associated system, may allow a secondary power source to be directly connected to the controller without requiring the use of any additional energy conversions, such as a DC/AC converter.

Embodiments have been described in terms of the control and management of power in an application, such as an elevator application. One skilled in the art will appreciate that embodiments may be adapted to accommodate different types of application environments. For example, the embodiments may be adapted to accommodate any application environment associated with power generation or power consumption, such as a heating or air conditioning/refrigeration application.

As described herein, in some embodiments various functions or acts may take place at a given location and/or in connection with the operation of one or more apparatuses, systems, or devices. For example, in some embodiments, a portion of a given function or act may be performed at a first device or location, and the remainder of the function or act may be performed at one or more additional devices or locations.

Embodiments may be implemented using one or more technologies. In some embodiments, an apparatus or system may include one or more processors, and memory storing instructions that, when executed by the one or more processors, cause the apparatus or system to perform one or more methodological acts as described herein. Various mechanical components known to those of skill in the art may be used in some embodiments.

Embodiments may be implemented as one or more apparatuses, systems, and/or methods. In some embodiments, instructions may be stored on one or more computer-readable media, such as a transitory and/or non-transitory computer-readable medium. The instructions, when executed, may cause an entity (e.g., an apparatus or system) to perform one or more methodological acts as described herein.

Embodiments may be tied to one or more particular machines. For example, one or more architectures may be configured to selectively power one or more systems, such as an elevator system or circuit. In some embodiments, the power may be derived from more than one source. For example, in some embodiments the power may be sourced from a grid or a battery.

Embodiments may transform an article into a different state or thing. For example, a power supply that otherwise might have hazardous energy available at its terminals may be placed in a state such that a person that comes into contact with the terminals is not exposed to that energy. In this manner, maintenance, repair, installation, and other activities may take place at substantially less risk. In some embodiments, a controller operated in accordance with a first input voltage type (e.g., AC) may be directly connected to a power source (e.g., a battery) that is operated in accordance with a second input voltage type (e.g., DC). Furthermore, in some embodiments, a switching mechanism may be used to power the controller in accordance with the most efficient means available.

Aspects of the invention have been described in terms of illustrative embodiments thereof. Numerous other embodiments, modifications and variations within the scope and spirit of the appended claims will occur to persons of ordinary skill in the art from a review of this disclosure. For example, one of ordinary skill in the art will appreciate that the steps described in conjunction with the illustrative figures may be performed in other than the recited order, and that one or more steps illustrated may be optional.

What is claimed is:

1. A power architecture for an elevator controller, the power architecture comprising:
   a panel receiving power from a power grid at a breaker;
   a power supply coupled to the breaker to receive power from the grid;
   a battery coupled to the power supply through a switch;
   an inverter to generate currents for a motor of an elevator;
   an inverter controller coupled to the power supply and to the inverter, the inverter controller configured to provide inverter control;
   the power supply providing power from one of the grid and the battery to the inverter controller; and
   a charger coupled to the breaker and the battery and configured to receive power from the power grid and provide power to the battery to charge the battery;
   wherein the switch is configured to open when the breaker opens due to an overcurrent condition;
   wherein the switch is configured to close when the power from the power grid is unavailable;
   wherein the switch is configured to be open during normal operation when the power from the power grid is available.

2. The power architecture of claim 1, wherein the battery is configured to be charged by the power grid when the power from the power grid is available.

3. The power architecture of claim 1, further comprising:
   a diode coupled to the battery and the charger and configured to ensure that the charging of the battery occurs through the charger and not the power supply and to provide power from the battery to the power supply when the power from the power grid is unavailable.

4. An apparatus comprising:
   an inverter to generate currents for a motor of an elevator;
   an inverter controller configured to be powered by a grid when power provided by the grid is available, the inverter controller configured to provide inverter control;
   a battery coupled to the grid and configured to be charged by power received from the grid when the power from the grid is available and to supply power to the inverter controller when the power from the grid is unavailable;
   a switch configured to selectively isolate power stored in the battery from the inverter controller based on a position of the switch that is selected from a breaker included in a panel;
   wherein the switch opens when the breaker opens due to an overcurrent condition and the switch closes when the power provided by the grid is unavailable;
   wherein the switch is open during normal operation when the power from the grid is available.

5. The apparatus of claim 4, further comprising: an isolation mechanism configured to isolate the battery from the grid when the power from the grid is unavailable.

6. The apparatus of claim 4, wherein the isolation mechanism comprises a diode.

7. The apparatus of claim 4, further comprising:
   a charger coupled to the grid and the battery and configured to receive power from the grid and provide power to the battery to continuously charge the battery when the power from the grid is available.

* * * * *